United States Patent
Su

(10) Patent No.: US 7,137,015 B2
(45) Date of Patent: Nov. 14, 2006

(54) SWITCHING POWER SUPPLY HAVING COOLING FAN COOLING DOWN SYSTEM AFTER POWER TURNED OFF

(75) Inventor: Steven Su, Taoyuan (TW)

(73) Assignee: Enermax Technology Corporation, Taoyuan (TW)

( * ) Notice: Subject to any disclaimer, the term of this patent is extended or adjusted under 35 U.S.C. 154(b) by 569 days.

(21) Appl. No.: 10/452,131

(22) Filed: Jun. 3, 2003

(65) Prior Publication Data

US 2004/0230845 A1    Nov. 18, 2004

(51) Int. Cl.
*G06F 1/26*    (2006.01)

(52) U.S. Cl. ............................... 713/300; 454/184

(58) Field of Classification Search ............... None
See application file for complete search history.

(56) References Cited

U.S. PATENT DOCUMENTS

| | | | | |
|---|---|---|---|---|
| 5,568,350 A | * | 10/1996 | Brown | 361/104 |
| 5,955,955 A | * | 9/1999 | Corcoran et al. | 361/687 |
| 6,567,262 B1 | * | 5/2003 | Meir | 361/676 |
| 6,588,907 B1 | * | 7/2003 | Billington et al. | 353/57 |
| 6,826,456 B1 | * | 11/2004 | Irving et al. | 361/695 |
| 2005/0050368 A1 | * | 3/2005 | Su | 713/300 |

* cited by examiner

*Primary Examiner*—Lynne H. Browne
*Assistant Examiner*—Anand B. Petel
(74) *Attorney, Agent, or Firm*—Troxell Law Office, PLLC

(57) ABSTRACT

Provided with a switching power supply including a built-in chip set so as to control a built cooling fan and or an ambient cooling fan to operate even after the computer system is shut down. As such, the heat built-up within the computer system can be effectively dissipated so as to prolong the service life of the computer.

2 Claims, 6 Drawing Sheets

SWITCHING POWER SUPPLY HAVING COOLING FAN COOLING DOWN SYSTEM AFTER POWER TURNED OFF

FIELD OF THE INVENTION

The present invention relates to a cooling fan, and particularly to a cooling fan installed within a switching power supply. The cooling fan keeps on cooling the system even after a computer system is turned off thereby effectively dissipating heat generated within the system during the operation.

DESCRIPTION OF THE PRIOR ART

A desktop computer is built-in with a switching power supply converting alternative current into direct current with different steady voltages so as to power different electronic devices installed within the computer system. However, the switching power supply requires as well an effective cooling system so as to provide steady power supply to power the computer system. As such, each switching power supply is provided with a cooling fan keeping the working temperature of the switching power supply within a certain limit to prevent the system being shut down because of the failure of the switching power supply.

The cooling fan built-in the switching power supply and/or the cooling system mounted on the computer enclosure are designed to be turned off when the computer system is shut down. Thinking about the computer has been working for such a long period of time, generating and accumulating a great deal of heat therein, it takes a certain period of time so as to cool down to the room temperature.

SUMMARY OF THE INVENTION

It is an object of the present invention to provide a switching power supply which has a built-in cooling fan which functions a certain period of time after the computer system is shut down. The switching power supply includes a controlling device distributing a power from "stand-by power" or "other auxiliary power" to the built-in cooling fan. As such, the power to the built-in cooling fan will not be shut down even the computer system is shut down. Accordingly, the built-in heat within the computer system can be effectively dissipated after the computer system is turned off.

The switching power supply made according to the present invention is set and operated according to the following:

A. Controllable Cooling Fans
   1. A built-in cooling fan.
   2. A cooling fan mounted in a computer enclosure.

B. The Setting of the Controllable Cooling Fan
   1. Set According to Temperature: This setting allow a pre-determined temperature to be set in factory or by end user. As long as a sensor mounted within the switching power supply or an externally detects the ambient temperature exceeding such setting, then the power to such cooling fan is shut off.
   2. Timer: A built-in timer can be set in factory or by end user to allow the built-in cooling fan to continue working after a certain period of time so as to cool down the whole system. The cooling fan will be shut off when the preset time elapses.

C. Setting for Cooling Fans
   1. All cooling fans are simultaneously shut off or in turn when a preset time elapses or a preset temperature is reached.
   2. Each cooling fan can be set individually so as to shut down separately according a tailored time elapsed or preset temperature is reached.

D. Settings of Timer or Thermos
   1. A knob with or without scales can be used to adjust the settings of the time or temperature.
   2. A push button with or without scales can be used to adjust the settings of the time or temperature.

The switching power supply having cooling fan working after the system turned off can be concluded at least the following advantages.
   1. Traditionally, when the system is shut down, those key electronic devices, such as CPU, hard disk drive, chip sets, electronic components mounted on the motherboard, and even the switching power supply itself are all remained in the working temperature. By the provision of the present invention, the heat built-in the system can be effectively dissipated because the cooling fan within the switching power supply is still working independently even after the system shut down. As such, the service life of the system is prolonged.
   2. Since each components generate different heat thereby creating a heat differential. The cooling fan can be set according to the ambient temperature around the components, thereby can be preset to a optimal operating time so as to reach the maximum cooling effect.

DESCRIPTION OF THE PREFERRED EMBODIMENT

Figure 1:
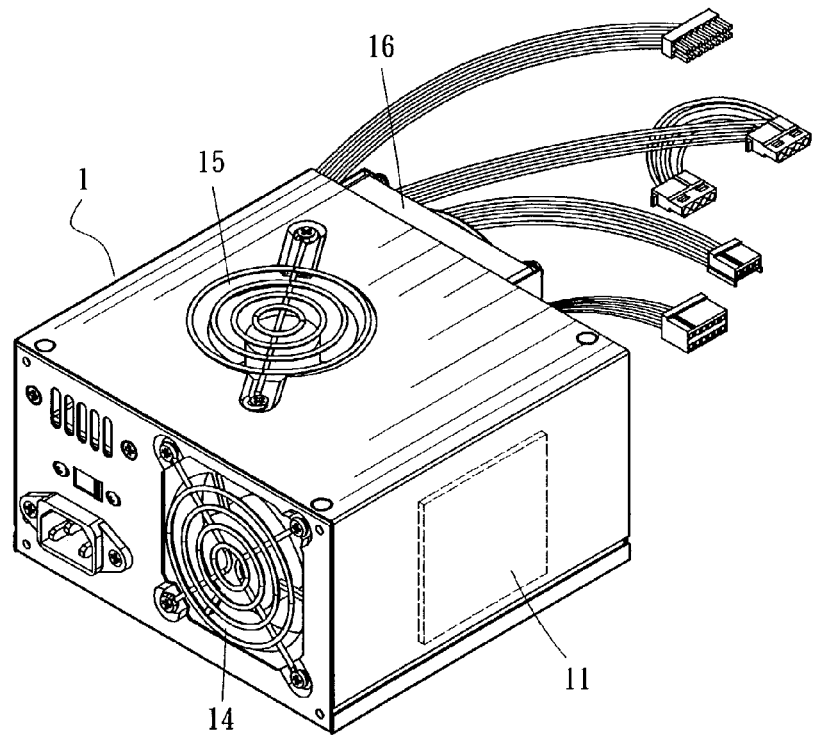
FIG. 1 is a perspective view of a switching power supply having a timer and thermo in according with the present invention.
Figure 3:
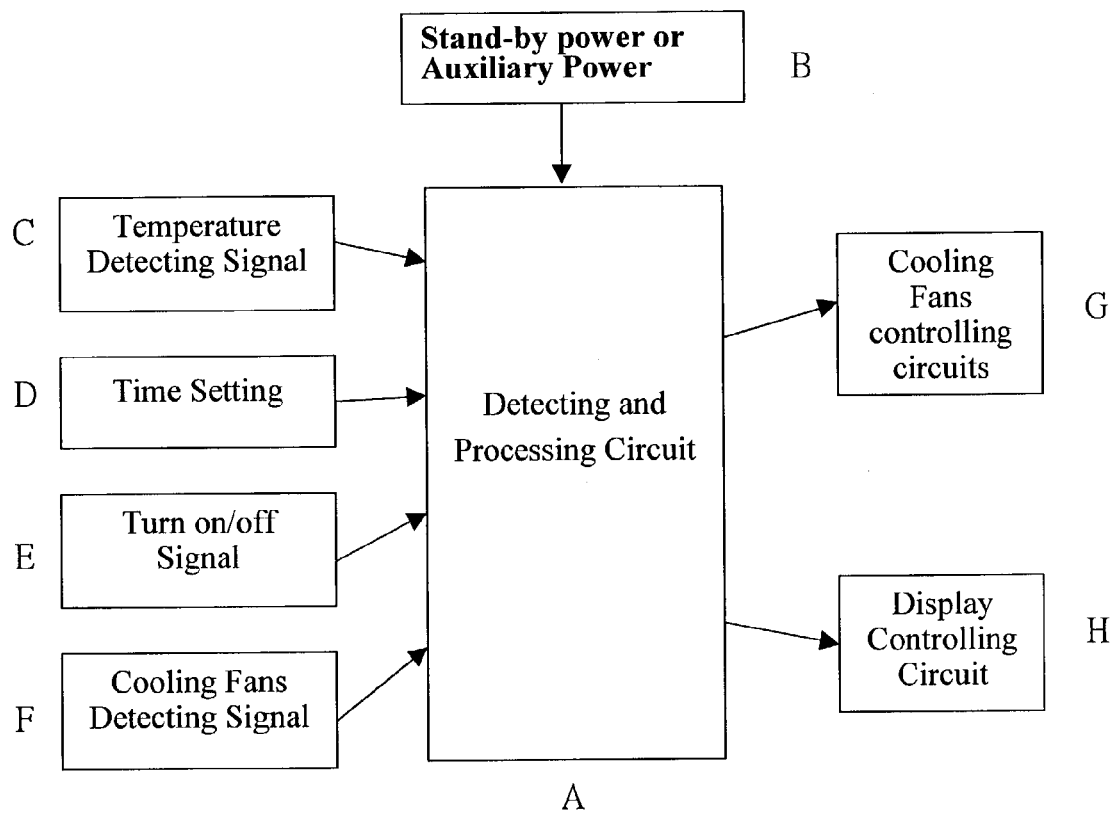
FIG. 3 is a flow chart of a controlling system.

Referring to FIGS. 1 and 3, a switching power supply 1 having controlling chip set includes a detecting and processing circuit (A), which is connected to a stand-by power or auxiliary power (B), temperature detecting signal (C), timer (D), switching on/off signal (E), cooling fan detecting signal (F), cooling fan controlling circuit (G), and display controlling circuit (H). Among the controlling circuits, the detecting and processing circuit (A) are logic processing center, providing controlling signal based on the temperature detecting signal (C), timer (D), switching on/off signal (E), cooling fan detecting signal (F) so as to control the stand-by power or auxiliary power (B), cooling fan controlling circuit (G), or commanding the system according to the preset settings.

Figure 2:
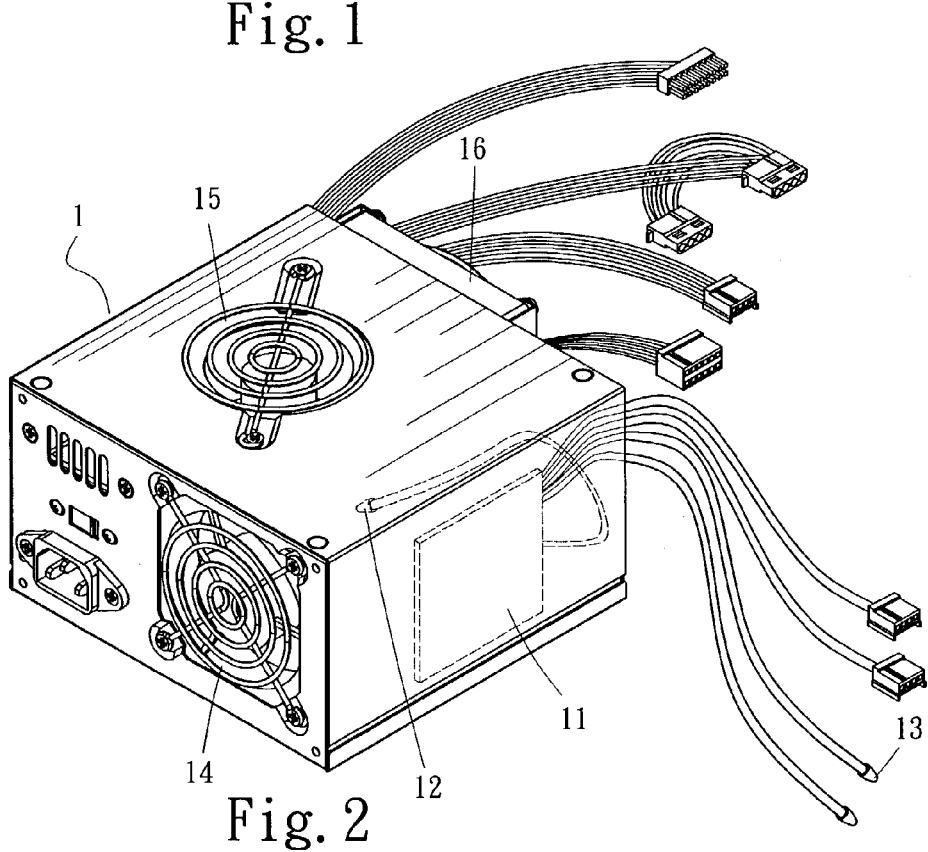
FIG. 2 is still a perspective view similar to FIG. 1.

The controlling chip set is mounted on a printed circuit board of the switching power supply (1). Alternatively, the controlling chip set can be mounted on another print circuit board (11) assembled to the power supply (1). As shown in FIG. 1, based on the preset time or preset temperature such as shown in FIG. 2, the controlling chip set will command the a stand-by power or auxiliary power (B) to power cooling fans (14, 15, 16) and ambient cooling fan (22) mounted on a metal enclosure (21) of a computer (2), thereby cooling the entire system after the preset time is elapsed or the temperature drops to the preset temperature. It should be noted that if the cooling fan is controlled by thermo, then temperature sensors (12, 13) mounted within the power supply (1) and/or the computer (2) have to electrically connected to the chip set or the printed circuit board (11).

The embodiment shown above is the switching power supply (1) built-in with a preset chip set. It means an end user can't change or adjust the preset settings, while the cooling fans (14, 15, 16) and ambient fan (22) mounted on the metal enclosure (21) of the computer (2) will automatically shut off after the preset time elapsed or the preset temperature reached. Those cooling fans will not be turned off even when the computer system is shut off. By this arrangement, the built-in heat within the computer system can be effectively dissipated by the working of the cooling fans.

Figure 4:
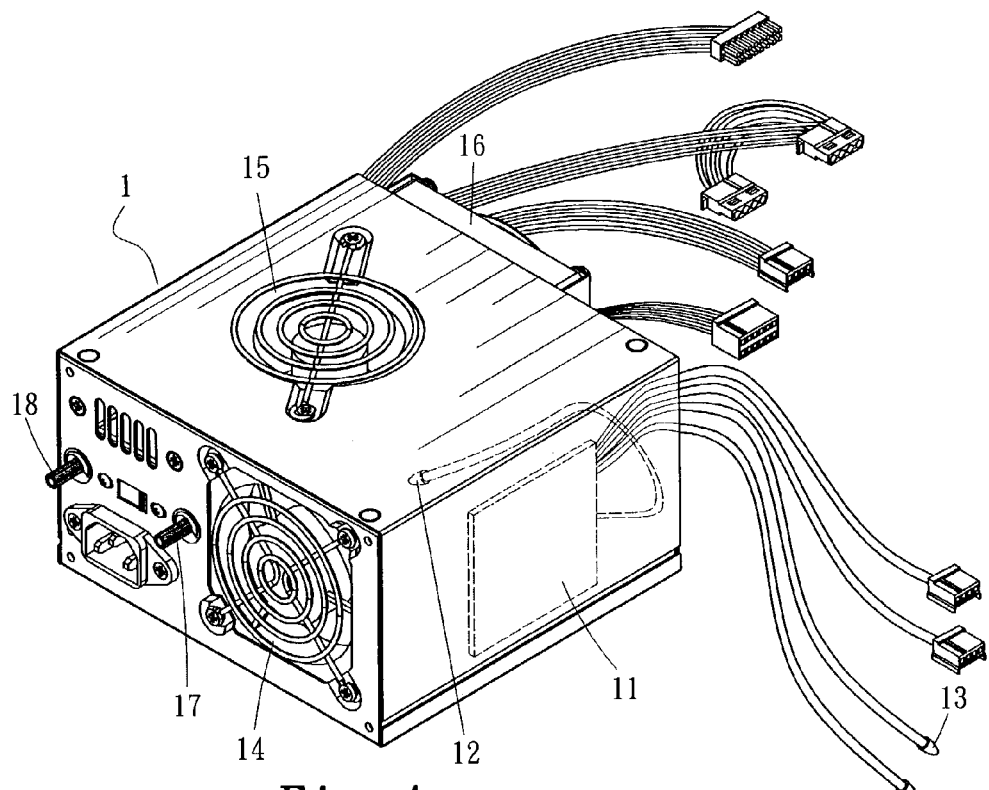
FIG. 4 is similar to FIG. 1 showing a timer and a thermo.
Figure 5:
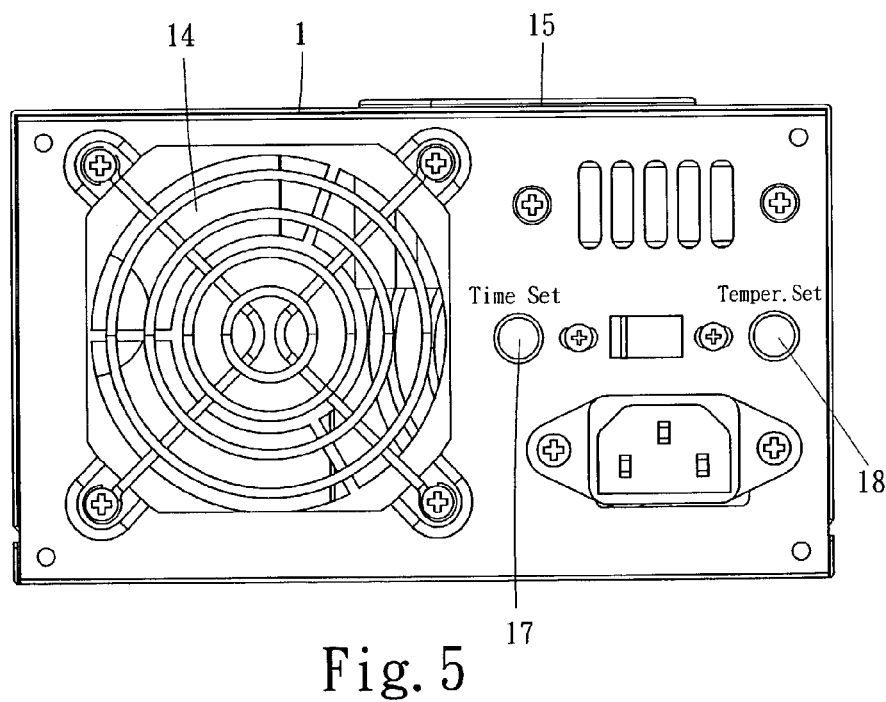
FIG. 5 is a front view of FIG. 1.
Figure 6:
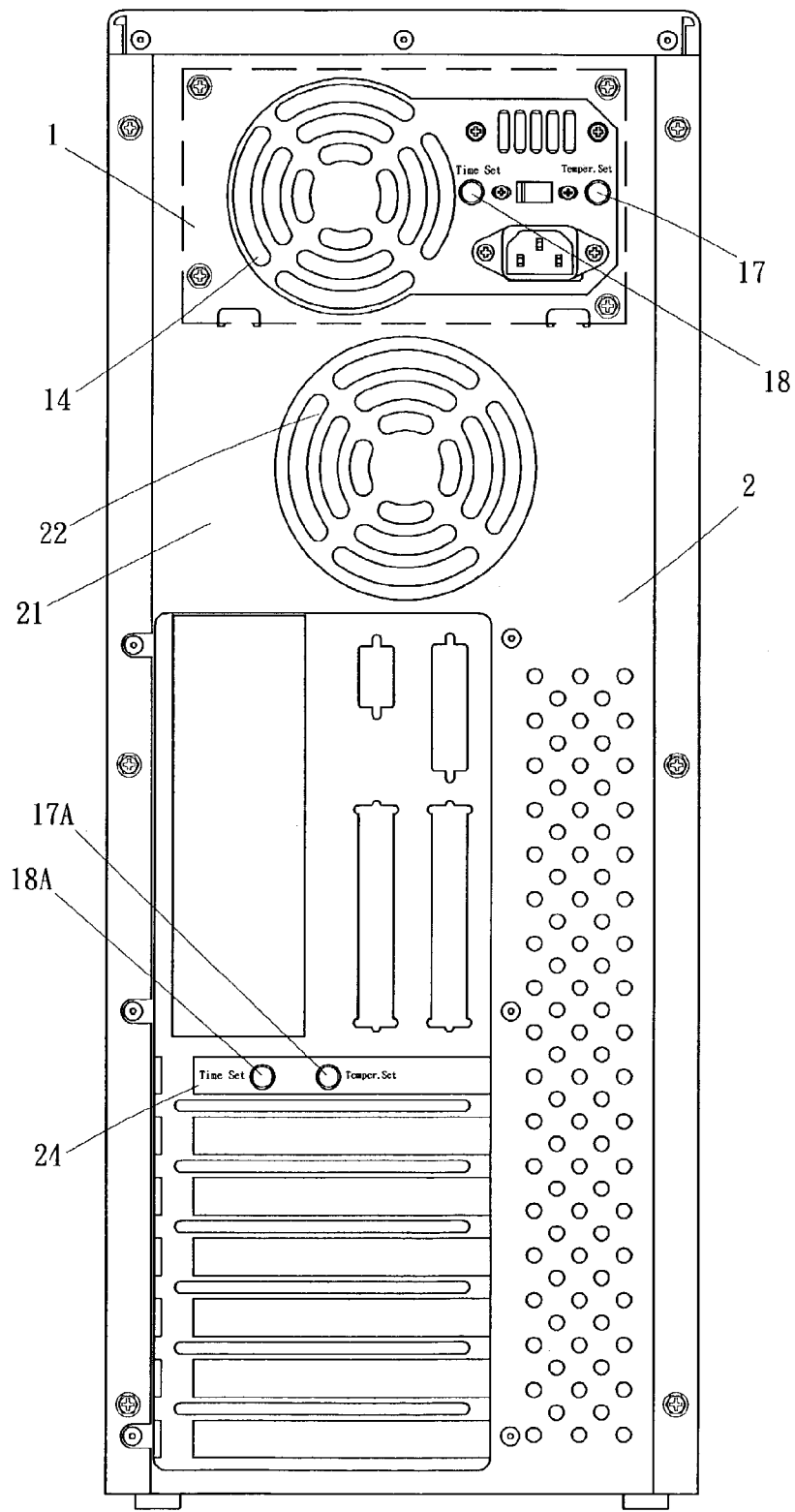
FIG. 6 is a front view of a back panel of a computer system in which the switching power supply in according to the present invention is installed.

According to a second embodiment, in addition to use the built-in chip set control the operation of the cooling fans (14, 22), the switching power supply (1) can be equipped with additional devices such the end user can adjust the timer and thermo so as to control the operating time of the cooling fans after the computer (2) is shut down. As shown in FIGS. 4 and 5, a time controlling knob (17) and a temperature controlling know (18) can be arranged so as to be accessible from outside of the switching power supply (1). When the switching power supply is mounted into the computer (2), the knobs (17, 18) are accessible from outside. Accordingly, the end user can use these two knobs (17, 18) to set up the operation of the cooling fans according to the end user's requirements either by timer or by thermo. Alternatively, time setting knob (17A) and temperature setting knob (18A) can be mounted on a interface card (24) accessible from the enclosure (21) of the computer (2), see FIG. 6. On the other hand, the time setting knob (17) and temperature setting knob (18) may with or without scales.

Figure 7:
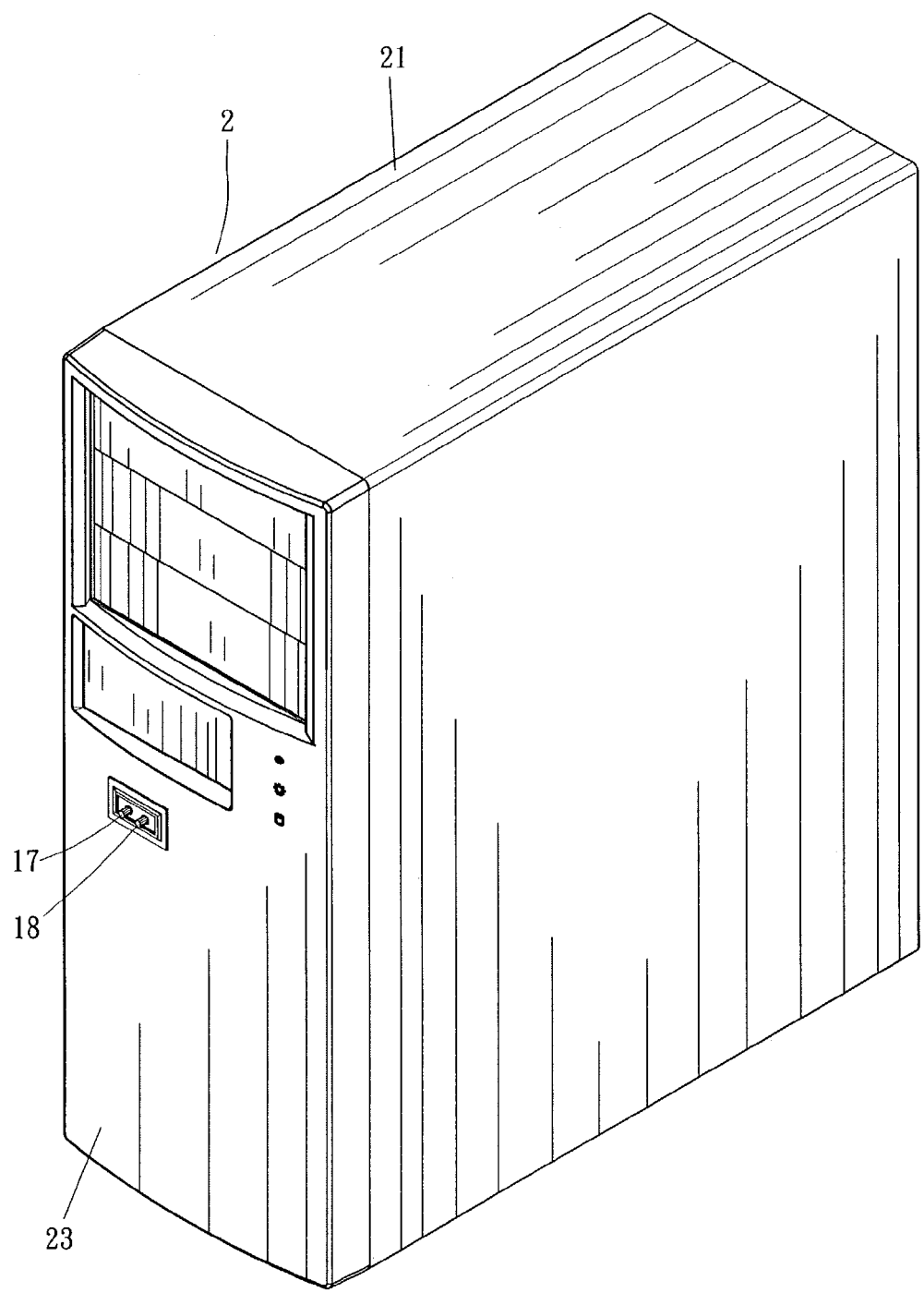
FIG. 7 is a perspective view of a computer system in which timer and thermo are accessible from a front panel of thereof.
Figure 8:
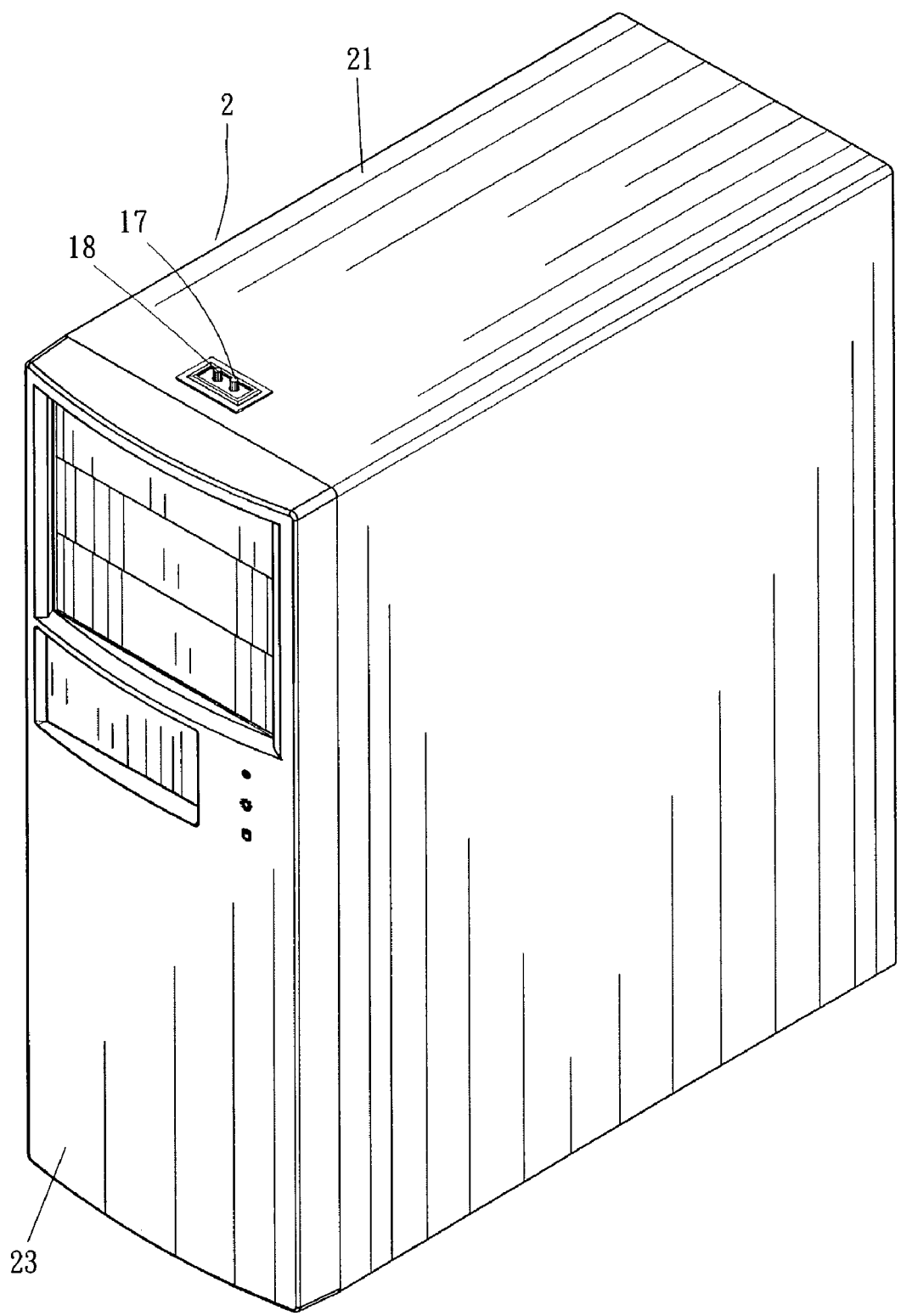
FIG. 8 is a perspective of a computer system in which two push buttons for setting timer and thermo are mounted.

The time setting knob (17) and temperature setting knob (18) can be further arranged outside of the power supply (1) for customer's own adjustment. For example, the time setting knob (17) and temperature setting knob (18) are arranged on top of the enclosure (21) of the computer (2) or the front panel (23) for being easily accessible from outside, as shown in FIGS. 7 and 8.

The cooling fans (14, 22) can be operated to a certain period of time even after the computer (2) is shut down according to the built-in chip set either based on preset timer or temperature. Both the cooling fans (14, 22) can be shut down independently or simultaneously when a preset time elapsed or the preset temperature reached.

In conclusion, the switching power supply (1) in accordance to the present invention provide a prolonged operation period so as to cool the entire system down even after the computer (2) is shut down. While the cooling fans (14, 22) are operating, the heat built-up can be effectively dissipated.

I claim:

1. A switching power supply having a built-in cooling fan which functions a certain period of time after the computer system is shut down, the switching power supply including a controlling chip set mounted on a built-in printed circuit board, or mounted on a separate circuit board, the chip set including a controlling circuit having preset time or temperature, distributing a power from one of stand-by-power and other auxiliary power to the built-in cooling fan so as to power the built-in cooling fan even when the computer system is shut down till the preset time elapsed or the preset temperature reached, wherein the switching power supply being provided with a time controlling knob and a temperature controlling knob electrically connected to the chip set such that an end user adjusts the time and temperature accordingly, the knobs are arranged on a back panel of the computer for direct external access, wherein the time controlling knob and the temperature controlling knob are arranged on an interface card of the computer providing a direct external adjustment.

2. A switching power supply having a built-in cooling fan which functions a certain period of time after the computer system is shut down, the switching power supply including a controlling chip set mounted on a built-in printed circuit board, or mounted on a separate circuit board, the chip set including a controlling circuit having preset time or temperature, distributing a power from one of stand-by-power and other auxiliary power to the built-in cooling fan so as to power the built-in cooling fan even when the computer system is shut down till the preset time elapsed or the preset temperature reached, wherein the switching power supply being provided with a time controlling knob and a temperature controlling knob electrically connected to the chip set such that an end user adjusts the time and temperature accordingly, the knobs are arranged on a back panel of the computer for direct external access, wherein the time controlling knob and the temperature controlling knob are arranged on a front panel of the computer or a top surface of the computer so as to provide an easy and direct adjustment.

* * * * *